United States Patent [19]
Perkins et al.

[11] Patent Number: 5,861,919
[45] Date of Patent: Jan. 19, 1999

[54] DYNAMIC RATE OPTIMIZATION FOR AN ENSEMBLE OF VIDEO ENCODERS

[75] Inventors: Michael Perkins, Louisville, Colo.; David Arnstein, Fremont, Calif.

[73] Assignee: Divicom, Milpitas, Calif.

[21] Appl. No.: 966,832

[22] Filed: Nov. 10, 1997

Related U.S. Application Data

[63] Continuation of Ser. No. 573,932, Dec. 18, 1995, abandoned.

[51] Int. Cl.⁶ .................................................. H04N 7/26
[52] U.S. Cl. ............................................ 348/385; 348/387
[58] Field of Search .................................. 348/385, 387, 348/411–414; 370/537–541

[56] References Cited

U.S. PATENT DOCUMENTS

| | | | |
|---|---|---|---|
| 5,115,309 | 5/1992 | Hang | 348/387 |
| 5,216,503 | 6/1993 | Park et al. | 348/385 |
| 5,361,096 | 11/1994 | Ohki et al. | 348/387 |
| 5,509,017 | 4/1996 | Brandenburg et al. | 370/112 |
| 5,550,590 | 8/1996 | Sakazawa et al. | 348/387 |
| 5,606,369 | 2/1997 | Keesman et al. | 348/385 |
| 5,629,736 | 5/1997 | Haskell et al. | 348/387 |

*Primary Examiner*—Victor R. Kostak
*Attorney, Agent, or Firm*—Meltzer, Lippe, Goldstein, et al.

[57] ABSTRACT

The present invention relates to a method for dynamically allocating bandwidth to each encoder in an ensemble of video encoders whose output bit streams share a single communications channel. In accordance with the present invention, the channel bandwidth is allocated to the individual encoders in the ensemble in such a way that differences in a quality measure among the decoders are reduced. The quality measure includes a term that behaves like a peak-signal-to-noise ratio (PSNR) and a term that measures the "masking effect" in a video signal. The "masking effect" results because an encoded frame with a high visual complexity masks coding artifacts from the viewer when it is decoded and displayed.

9 Claims, 2 Drawing Sheets

DYNAMIC RATE OPTIMIZATION FOR AN ENSEMBLE OF VIDEO ENCODERS

This is a continuation of application Ser. No. 08/573,932, filed Dec. 18, 1995, now abandoned.

FIELD OF THE INVENTION

The present invention relates to a method for dynamically allocating bandwidth to each encoder in an ensemble of video encoders whose output bit streams share a single communications channel. In accordance with the present invention, the channel bandwidth is allocated to the individual encoders in the ensemble in such a way that differences in a quality measure among the encoders are reduced. The quality measure includes a term that behaves like a peak-signal-to-noise ratio (PSNR) and a term that measures the "masking effect" in a video signal. The "masking effect" results because an encoded frame with a high visual complexity masks coding artifacts from the viewer when the frame is decoded and displayed.

BACKGROUND OF THE INVENTION

An ensemble of video encoder systems is illustrated in FIG. 1. The ensemble 10 comprises a plurality of video encoder systems 20-i, i=0, 1, 2, . . . , P−1. Each encoder system receives uncompressed video at an input 22-i and outputs a compressed digital video bitstream at an output 24-i. Illustratively, each encoder system 20-i outputs a compressed digital bit stream which complies with the syntax specified in the MPEG-2 video specification (ISO\IEC13818-2; Recommendation ITU-TH.262 (1995E) produced by ISO, the contents of which are incorporated herein by reference).

The digital bit streams output by the encoder systems 20-i are multiplexed together by the system multiplexer 30 and the multiplexed bitstream is transmitted to one or more decoders via the common channel 40. A system controller 50 controls the system multiplexer 30. The system controller 50 allocates a fraction of the bandwidth of the channel 40 to each of the encoder systems. The system controller 50 may be implemented as a microprocessor or microcontroller. The present invention relates to a novel method for allocating the bandwidth of the channel 40 among the encoder systems 20-i.

A video encoder system 20 is illustrated in FIG. 2. The system 20 includes a preprocessor 14, a video encoder 16, a rate buffer 18 and a rate controller 19. The preprocessor 14 receives a digital video signal comprising a sequence of frames from a source 12. The source 12 of video is, for example, a video camera, or a telecine machine which converts a sequence of film images into a sequence of video frames, or other device which outputs a sequence of video frames. The preprocessor 14 performs a variety of functions to place the sequence of video frames into a format in which the frames can be compressed by the encoder. For example, in case the video source is a telecine machine which outputs 30 frames per second, the preprocessor 14 converts the video signal into 24 frames per second for compression in the encoder 16 by detecting and eliminating duplicate fields produced by the telecine machine.

In addition, the preprocessor may spatially scale each frame of the source video so that it has a format which meets the parameter ranges specified by the encoder 16.

The video encoder 16 is preferably an encoder which utilizes a video compression algorithm to provide an MPEG-2 compatible bit stream. The MPEG-2 bit stream has six layers of syntax. There are a sequence layer (random access unit, context), Group of Pictures layer (random access unit, video coding), picture layer (primary coding layer), slice layer (resynchronization unit), macroblock (motion compensation unit), and block layer (DCT unit). A group of pictures (GOP) is a set of frames which starts with an I-frame and includes a certain number of P and B frames. The number of frames in a GOP may be fixed. A macroblock in a video frame illustratively comprises four 8×8 pixel blocks of luminance information and two 8×8 pixel blocks of chrominance information.

The encoder distinguishes between three kinds of frames, (i.e., pictures) I, P, and B. The coding of I frames results in the most bits. In an I-frame, each macroblock is coded as follows. Each 8×8 block of pixels in a macroblock undergoes a DCT (discrete cosine) transform to form an 8×8 array of transform coefficients. The transform coefficients are then quantized with a variable quantizer matrix. The resulting quantized DCT coefficients are zig-zag scanned to form a sequence of DCT coefficients. The DCT coefficients are then organized into run, level pairs. The run, level pairs are then entropy encoded. In an I-frame, each macroblock is encoded according to this technique. It should be noted that the quantizer matrix used to quantize each macroblock is multiplied by a scale factor which can vary from one macroblock to the next.

In a P-frame, a decision is made to code each macroblock as an I macroblock, which is then encoded according to the technique described above, or to code the macroblock as a P macroblock. For each P macroblock, a prediction of the macroblock in a previous video frame is obtained. The prediction is identified by a motion vector which indicates the translation between the macroblock to be coded in the current frame and its prediction in the previous frame. (A variety of block matching algorithms can be used to find the particular macroblock in the previous frame which is the best match with the macroblock to be coded in the current frame. This "best match" macroblock becomes the prediction for the current macroblock.) The predictive error between the predictive macroblock and the current macroblock is then coded using the DCT, quantization, zig-zag scanning, run, level pair encoding, and entropy encoding. In order to do predictive encoding of this type, the video encoder 16 inherently includes a decoder. This decoder decodes a frame which is compressed by the encoder. The decoded frame is then stored and used to make the motion compensated predictions described above.

In the coding of a B-frame, a decision has to be made as to the coding of each macroblock. The choices are (a) intracoding (as in an I macroblock), (b) unidirectional backward predictive coding using a subsequent frame to obtain a motion compensated prediction, (c) unidirectional forward predictive coding using a previous frame to obtain a motion compensated prediction, and (d) bidirectional predictive coding wherein a motion compensated prediction is obtained by interpolating a backward motion compensated prediction and a forward motion compensated prediction. In the cases of forward, backward, and bidirectional motion compensated prediction, the predictive error is encoded using DCT, quantization, zig-zag scanning, run, level pair encoding and entropy encoding.

B frames have the smallest number of bits when encoded, then P frames, with I frames having the most bits when encoded. Thus, the greatest degree of compression is achieved for B frames. For each of the I, B, and P frames, the number of bits resulting from the encoding process can be controlled by controlling the quantization step size. A macroblock of pixels or pixel errors which is coded using a large quantizer step size results in fewer bits than if a smaller quantizer step size is used.

After encoding by the video encoder, the bit stream is stored in the encoder rate buffer 18. Then, the encoded bits are transmitted via the system multiplexer 30 and channel 40 (see FIG. 1) to a decoder, where the encoded bits are received in a buffer of a decoder.

Each individual encoder system 20 has its own rate controller 19. The purpose of the rate controller 19 is to maximize the perceived quality of the encoded video sequence when it is decoded at a decoder by intelligently allocating the number of bits used to encode each frame. The sequence of bit allocations to successive frames preferably ensures that a channel bit rate assigned by the system controller 50 of FIG. 1 is maintained and that decoder buffer exceptions (overflow or underflow) are avoided. The process of allocating bits to individual frames takes into account the frame type (I, P or B) and scene dependent coding complexity. To accomplish rate control at each individual encoder system 20, the rate controller 19 receives input information indicating the occupancy of the rate buffer 18. The rate controller 19 executes a rate control algorithm and feeds back control signals to the encoder 16 (and possibly to the preprocessor 14, as well) to control the number of bits generated by the encoder for succeeding frames.

Several rate control algorithms are known. An illustrative rate control algorithm is disclosed in U.S. patent application Ser. No. 08/573,933 entitled RATE CONTROL FOR A VIDEO CONTROLLER, filed for Michael Perkins and David Arnstein on even date herewith and assigned to the assignee hereof. The contents of this related application are incorporated herein by reference.

Dynamic rate optimization or statistical multiplexing is a method for making more effective use of the bandwidth of a single communication channel through which several MPEG-2 or other digital video bitstreams are transmitted. A satellite transponder is an example of such a communication channel. Such a channel typically has a bandwidth of 40 MHz which is shared among 10–15 bitstreams. A dynamic rate optimizing or statistical multiplexing strategy dynamically allocates the channel bandwidth among several encoder systems that share the communication channel. Each encoder system 20-i transmits periodically (e.g., once per frame interval) a measure of video quality via a communication path to the system controller 50. The system controller 50 determines adjusted bitrate allocations for the individual video encoder systems 20. The system controller 50 transmits the adjusted bit rate allocations to the rate controllers of the individual encoder systems 20 in order to drive the video quality measurements to equality. Naturally, the sum of these bitrate allocations must equal the total channel bitrate. The rate controller at the individual encoder systems take into account the adjustments in allocation of channel bitrate when allocating bits to the frames that are encoded by the encoder systems.

In conventional video encoder ensembles, the quality measure outputted by each individual video encoder system to the system controller is a Peak-Signal-to-Noise Ratio (PSNR). The encoder can output this information because, as indicated above, it has available both the encoded and decoded frames. The system controller determines channel bandwidth allocation adjustments so as to equalize the average Peak-Signal-to-Noise Ratio across all of the video encoder systems. More bitrate is allocated to encoders with a small PSNR and less bit rate is allocated to encoders with large PSNR.

The problem with using PSNR as a quality measure is that the "masking effect" is not taken into account. A frame with a lot of visual complexity can hide coding artifacts from the viewer when the frame is decoded and displayed. It is well known that a quality measure in the form of a PSNR does not take into account the masking effect and does not take into account subjective image quality.

It is an object of the present invention to provide a dynamic rate optimizing or statistical multiplexing process for an ensemble of video encoder systems, which overcomes the shortcomings of the above-described prior art dynamic rate optimizing or statistical multiplexing process.

In particular, it is an object of the invention to allocate bandwidth to a plurality of video encoder systems which share a common transmission channel in a manner which takes into account the masking effect and subjective image quality.

SUMMARY OF THE INVENTION

In accordance with the present invention, the quality measure which is equalized across encoder systems in the conventional dynamic rate optimizing or statistical multiplexing process is replaced with a quality measure which takes into account the masking effect.

The quality measure used in the bandwidth allocation process of the present invention includes a term that behaves like PSNR. This term is a measure of the quantization used by the encoder to quantize the DCT coefficient derived from each macroblock. The other term in the quality measure is the term that measures the visual complexity of the frames being encoded. The visual complexity measure is obtaining by differencing adjacent pixels, horizontal and vertical, and summing these differences. These sums are then averaged over a plurality of frames to obtain the visual complexity term used in the quality measure.

In a preferred embodiment of the invention, the individual encoder systems periodically (e.g., once per frame interval) transmit the quantization measure and visual complexity measure to the system controller. The multiplexer controller then determines the quality measure for all the video encoder systems. The system controller also determines channel bandwidth allocation adjustments for the individual encoder systems. The adjustments in channel bandwidth allocation are determined so as to decrease quality measure differences among the encoder systems.

The adjustments in bandwidth allocation are communicated from the system controller to the rate controllers of the individual video encoder systems. The individual rate controllers then allocate bits to the frames to be encoded in accordance with the updated bandwidth allocation.

In an illustrative embodiment, the video signals to be compressed by the encoder systems have 24–30 frames per second. The system controller receives the quantization measure and the visual complexity measure once per frame period and adjusts the bandwidth allocations more than twenty times per second. The individual video encoder systems need not be genlocked with each other.

Preferably, only relatively small adjustments to the bandwidth allocations are made. At each rate update, however, the cumulative rate change over time can be large. Thus, in some embodiments of the invention, there is imposed an upper limit on the size of each individual bandwidth adjustment.

DETAILED DESCRIPTION OF THE INVENTION

Figure 1:
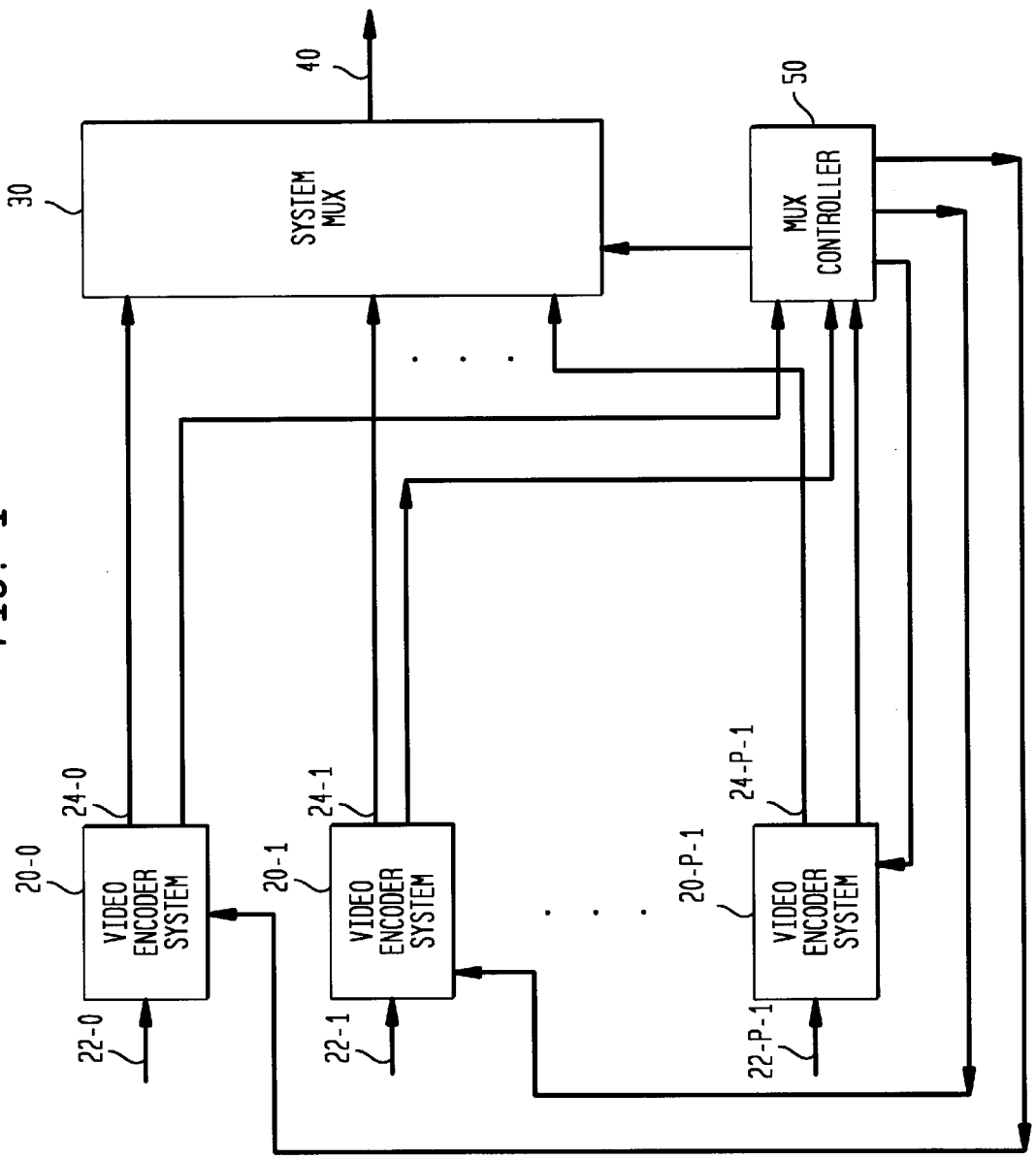
FIG. 1 schematically illustrates an ensemble of video encoder systems which share a common transmission channel.

As indicated above, the present invention is a method for operating a collection of video encoder systems which share the bandwidth of a transmission channel. As shown in FIG. 1, the bitstreams of the individual encoder systems 20-i, are multiplexed together by a system multiplexer 30. The fraction of the channel bandwidth allocated to each encoder system is determined by a system controller 50 (implemented as a microprocessor for example). The system controller 50 receives certain information from the individual encoder systems 20-i and outputs back to the encoder systems bandwidth allocation adjustment information.

The hardware used to implement the encoder systems, system controller and system multiplexer is conventional. The difference of the present invention lies in the specific measures transmitted from the individual encoder systems to the system controller, and the steps carried out by the system controller to determine the bandwidth allocation adjustments.

In this discussion, subscripts (typically the letter i) will indicate a choice of an individual video encoder system (e.g. 20-i of FIG. 1) within the ensemble 10 of video encoder systems. A letter in parentheses (typically the letters n and m) will indicate a frame number.

Each encoder system i transmits to the system controller 50 a measure of quantization, which is reported for each frame n. This quantization measure is called $QSCALE_i(n)$. It is computed by a processor in the video encoder circuit 16 and is proportional to the sum (over macroblocks) of the quantization values used to code DCT coefficients.

A moving average of the QSCALEs over H frames will be maintained as $$Q_i(n) = \sum_{m=0}^{H-1} QSCALE_i(n-m) \quad \text{EQ (1)}$$

Here, H is a tuning parameter.

Figure 2:
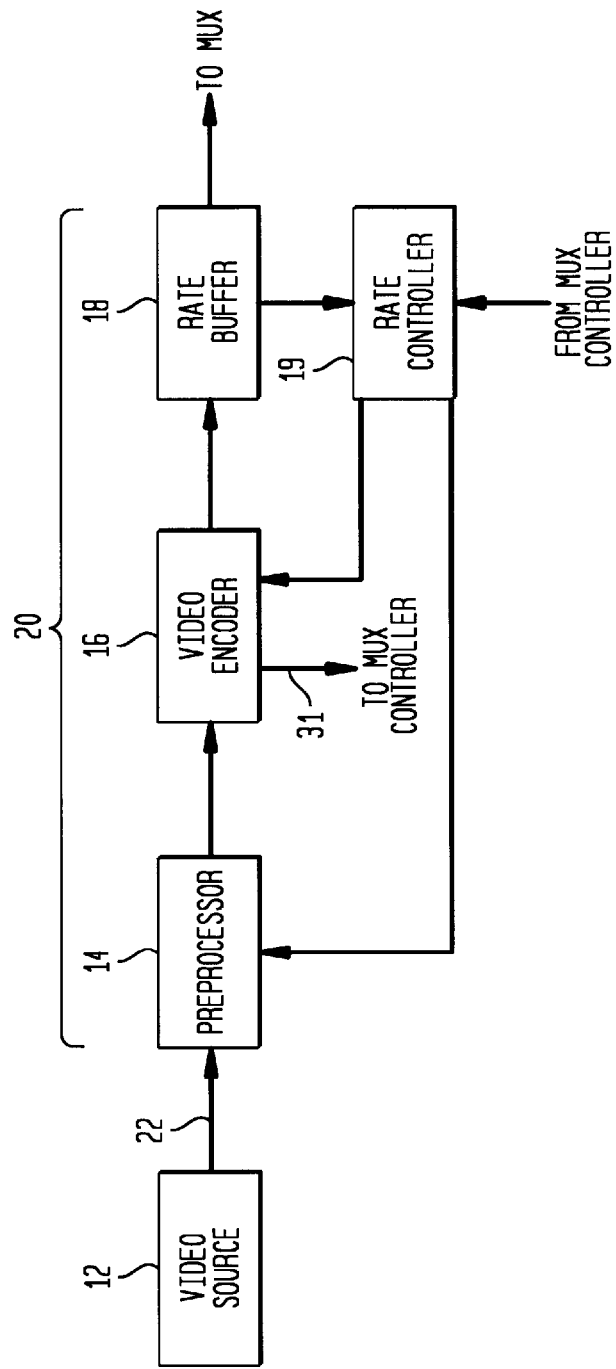
FIG. 2 schematically illustrates a video encoder system in the ensemble of FIG. 1.

Each encoder system i also provides to the system encoder a measure of spatial complexity that is used to measure masking effects. For encoder system i and frame n, this quantity is called $INTRA\_MASK_i(n)$. It is computed by the processor in the video encoder circuit 16 (see FIG. 2) and measures complexity by differencing adjacent pixels in the same frame, in both horizontal and vertical pairs. These differences are then summed to obtain 25 $INTRA\_MASK_i(n)$ This measure is averaged over time as $$M_i(n) = \sum_{m=0}^{H-1} INTRA\_MASK_i(n-m) \quad \text{EQ (2)}$$

The system controller 50 averages the above complexity measures $M_i(n)$ over all of the P encoder systems. This averaging is performed once per iteration of the bandwidth allocation adjustment process by the system controller. This frequency would be equal to the encoder frame rate, if all the encoders were genlocked. However, this is not necessarily the case. For this reason, the (n) notation is not featured in statistics maintained by the system controller. The average over video encoder systems is $$\overline{M} = \frac{1}{P} \sum_{i=0}^{P-1} M_i \quad \text{EQ (3)}$$

Here, P is the number of participating video encoder systems, and $M_i$ is the latest $M_i(n)$ taken from video encoder system i.

The quality measure used to make the bandwidth allocation adjustments by the system controller is given as $$T_i = \frac{\beta M_i + \overline{M}}{M_i + \beta \overline{M}} \cdot \frac{1}{Q_i} \quad \text{EQ (4)}$$

Once again $M_i$ is the latest $M_i(n)$ taken from video encoder system i, and $Q_i$ is the latest $Q_i(n)$ taken from video encoder system i. $\beta$ is a tuning parameter.

In this definition of $T_i$, the term $1/Q_i$ is used as an error measure, somewhat like a PSNR.

The modifier $(\beta M_i + \overline{M})/(M_i + \beta \overline{M})$ applies a correction which is largest when the masking measure $M_i$ for encoder i is much higher than the average over encoder systems $\overline{M}$. In such a case, the correction factor approaches $\beta$. This behavior would occur when frame n from encoder system i exhibits strong masking effects, hiding the coding artifacts which are measured by $1/Q_i$.

Having defined a target measure $T_i$ to be equalized across all encoder systems i, a method carried out by the system controller 50 is provided for gently adjusting the channel bitrates in order to reach this goal. This typically requires several frames worth of adjustments.

The system controller 50 first generates an average over encoders of the quality measures $T_i$:

$$\overline{T} = \frac{1}{P} \sum_{i=0}^{P-1} T_i \quad \text{EQ (5)}$$

Next, the system controller 50 determines deviations from the above average, and identifies individual video encoder systems which are above and below this average:

$$d_i = T_i - \overline{T}$$
$$\theta_- = \{i | T_i < \overline{T}\}$$
$$\theta_+ = \{i | T_i > \overline{T}\} \quad \text{EQ (6)}$$

The system controller 50 sums up the one-sided deviations as follows:

$$D = \sum_{i \in \theta_+} d_i \quad \text{EQ (7)}$$

Note that D is positive. Also, from the definition of $\overline{T}$, $$D = - \sum_{i \in \theta_-} d_i$$

The following term will be featured in the bandwidth allocation adjustment. It expresses the relative deviation from the norm of one of the video encoder systems:

$$\gamma_i = \frac{d_i}{D} \quad \text{EQ (8)}$$

Each time the bitrates are adjusted, $\Delta$ bits per second will be transferred from the video encoder systems with greater than average quality to the video encoder systems with less than average quality. Δ is given by the following expression:

$$\Delta = \frac{\max T_j - \min T_j}{\overline{T}} \cdot R \cdot \alpha \qquad \text{EQ (9)}$$

Here R is the total channel bandwidth and α is a tuning parameter, which is given a small value.

Having computed these various statistics on video encoder system performance, the system controller 50 determines the following additive correction to the channel bitrate of video encoder system i:

$$\delta_i = -\gamma_i \Delta. \qquad \text{EQ (10)}$$

It can be shown that $$\sum_{i=0}^{P-1} \delta_i = 0 \qquad \text{EQ (11)}$$

so that the summed bandwidth of the participating video encoder systems does not change. It can also be shown that $$\sum_{i=0}^{P-1} |\delta_i| = 2\Delta \qquad \text{EQ (12)}$$

This indicates that Δ is the total number of bits per second to be reassigned from the video encoder systems which are performing above the average $\overline{T}$ to those which are performing below this average. Equation 10 states that this total pool of bits is redistributed among the video encoder systems in a weighted fashion, the weights are the $y_i$. These weights cause a large fraction of the pool to be applied to an encoder system that departs significantly from the average $\overline{T}$, and a small fraction to be applied to an encoder system whose quality measure $\overline{T}$ is near this average.

Alternatively, there is a slightly more economical way to compute D. Define the absolute central moment of the $\{T \cdot\}$ as $$M_{abs} = \frac{1}{P} \sum_{i=0}^{P-1} |T_i - \overline{T}|$$

then it turns out:

$$D = \frac{P}{2} M_{abs}. \qquad \text{EQ (13)}$$

The number of operations necessary to compute D and $M_{abs}$ is approximately the same, except that computing $M_{abs}$ does not involve comparisons.

Using simulation studies, the following values have been is selected:

$$\alpha = 0.0005$$
$$\beta = 2.0$$
$$H = 5 \qquad \text{EQ (14)}$$

Consider the following expanded expression for $\delta_i$:

$$\delta_i = -\frac{[T_i - \overline{T}][\max T_j - \min T_j]}{\overline{T}D} \cdot R \cdot \alpha \qquad \text{EQ (15)}$$

This is the additive correction to be applied to the bitrate for encoder system i. Note that the bitrates themselves are not featured in this expression. Therefore, no attempt is made to relate channel bitrate to the quality measures $\{T_i\}$. Instead, the method simply seeks to gently decrease the fraction of channel bandwidth assigned to encoder systems producing higher than average quality, and to gently increase the fraction of channel bandwidth assigned to encoders producing less than average quality. This is the effect of the term $[T_i - \overline{T}]$. The inventive method for controlling an ensemble of video encoder systems limits the amount of change that is permissible. This is the effect of the term Rα. The remaining multiplicative term $$\frac{\max T_j - \min T_j}{\overline{T}D}$$

applies scaling in response to the degree of variability of the individual scores $\{T_i\}$.

It will be useful to set an absolute limit on the amount of change that is permissible to the individual bitrates. This is most easily accomplished by temporarily setting α to a lower value. This is equivalent to the following:

1. Compute the $\delta_i$ as above. Record the largest absolute value of these numbers as C.
2. If C is larger than the desired maximum U, then simply scale the corrections according to $$\delta_i = \frac{U}{C} \delta_i \qquad \text{EQ (16)}$$

Another approach would be to separate encoder systems into two groups: those whose $\delta_i$ values are below the maximum U in absolute value, and those whose $\delta_i$ values are not. For the following, refer to these as the first and second group of encoders, respectively. The encoders whose $\delta_i$ are too large (second group) would be assigned the maximum change ±U. The second group of encoders does not play a part in the rest of the computation.

The encoders in the first group would be the subject of the bandwidth allocation adjustment method described above, but with R reduced by the sum of the bitrates used by the encoders in the first group.

The above two part process would have to be iterated, until none of the $\delta_i$ exceeded U in absolute value. This alternate method would presumably select larger values for the $\delta_i$, resulting in faster overall convergence to the desired condition of all encoder systems exhibiting the same image quality.

In short, a method for dynamically allocating bandwidth among a plurality of video encoder systems which share the same transmission channel has been disclosed. Finally, the above described embodiments of the invention are intended to be illustrative only. Numerous alternative embodiments may be devised by those skilled in the art without departing from the spirit and scope of the following claims.

We claim:

1. A method for dynamically allocating bandwidth to each of a plurality of video encoder systems which share a single transmission channel comprising the steps of:

at a controller, generating for each individual encoder system a quality measure which takes into account a measure of quantization used by each individual encoder system and a measure of visual complexity of a video signal being encoded by the individual encoder system, at said controller, determining for each individual encoder system, a deviation of the quality measure of each individual encoder system from an average quality measure taken over all of said encoder systems, and adjusting a fraction of a bandwidth of said channel allocated to each individual encoder system in such a way that said deviations in the quality measure among said individual encoders are reduced.

2. The method of claim 1 wherein said measure of quantization for each individual encoder system is proportional to a sum of quantization scale factors used to code macroblocks in each of a plurality of frames.

3. The method of claim 2 wherein said measure of visual complexity is for each individual encoder system proportional to a measure obtained by differencing adjacent pixels within the same frame, summing these differences, and averaging the sums over a plurality of frames.

4. The method of claim 1 wherein said quality measure for each individual encoder i is given by $$T_i = \frac{\beta M_i + \overline{M}}{M_i + \beta \overline{M}} \cdot \frac{1}{Q_i}$$

wherein $Q_i$ is proportional to an average quantization parameter used by the individual encoder i, i=0, 1, 2 . . . , wherein $M_i$ is a visual complexity measure of the video signal being encoded by the $i^{th}$ individual encoder system, wherein $\overline{M}$ is an average complexity measure taken over all the encoder systems, and wherein $\beta$ is a constant.

5. The method of claim 4 wherein $Q_i$ is proportional to the average quantization scale factor used by the $i^{th}$ encoder system to code the macroblocks in a plurality of frames.

6. The method of claim 5 wherein $M_i$ for each individual encoder system is obtained by each individual encoder system by differencing adjacent pixels in the same frame, summing the differences, and summing the resulting sums over several frames.

7. The method of claim 1 wherein an adjustment of bandwidth of an individual encoder cannot exceed a predetermined maximum.

8. A method for dynamically allocating bandwidth to each of a plurality of video encoder systems which share a single transmission channel comprising the steps of:

at a controller, generating for each individual encoder system a quality measure which takes into account a measure of quantization used by each individual encoder system and a measure of visual complexity of a video signal being encoded by the individual encoder system;

at said controller, determining for each individual encoder system, a variation of the quality measure of each individual encoder system from an average quality measure taken over all of said encoder systems, and adjusting a fraction of a bandwidth of said channel allocated to each individual encoder system in such a way that said variations in the quality measure among said individual encoders are reduced.

9. A method for dynamically allocating bandwidth to each of a plurality of video encoder systems which share a single transmission channel comprising the steps of:

at a controller, generating for each individual encoder system a quality measure which takes into account a measure of quantization used by each individual encoder system and a measure of visual complexity of a video signal being encoded by the individual encoder system;

at said controller, determining for each individual encoder system, a deviation of the quality measure of each individual encoder system from an average quality measure taken over all of said encoder systems, and adjusting a fraction of a bandwidth of said channel allocated to each individual encoder system in such a way that said deviations in the quality measure among said individual encoders are reduced;

wherein said measure of complexity for each individual encoder system is obtained by generating differences between pairs of adjacent pixels within the same picture, summing a set of numbers each of which is derived from a corresponding one of said differences, and averaging the sum over one or more pictures.

* * * * *